United States Patent
Thurston et al.

[11] Patent Number: 6,149,130
[45] Date of Patent: Nov. 21, 2000

[54] BUTTERFLY VALVES

[75] Inventors: David Frederick Thurston; John Furness, both of Dorset, United Kingdom

[73] Assignee: Solent & Pratt (Engineering) Limited, United Kingdom

[21] Appl. No.: 09/423,001

[22] PCT Filed: May 1, 1997

[86] PCT No.: PCT/GB97/01198

§ 371 Date: Jan. 25, 2000

§ 102(e) Date: Jan. 25, 2000

[87] PCT Pub. No.: WO98/50716

PCT Pub. Date: Nov. 12, 1998

[51] Int. Cl.[7] .............. F16K 25/00; F16K 5/00; E03B 7/07

[52] U.S. Cl. .......... 251/173; 251/306; 251/314; 137/557

[58] Field of Search .................. 251/173, 306, 251/314; 137/557, 312

[56] References Cited

U.S. PATENT DOCUMENTS

| | | |
|---|---|---|
| 3,076,631 | 2/1963 | Grove . |
| 4,249,568 | 2/1981 | Duggan ................... 137/312 |
| 4,265,426 | 5/1981 | Thurston et al. . |
| 4,598,734 | 7/1986 | Moyes ...................... 137/557 |
| 4,785,844 | 11/1988 | Pankov ..................... 137/312 |
| 5,520,209 | 5/1996 | Goins et al. ............... 137/557 |

FOREIGN PATENT DOCUMENTS

| | | |
|---|---|---|
| 1931755 | 1/1966 | Germany . |
| 7022577 | 9/1971 | Germany . |
| 901607 | 7/1962 | United Kingdom . |
| 1428066 | 3/1974 | United Kingdom . |
| 1512482 | 3/1976 | United Kingdom . |
| 1604095 | 4/1978 | United Kingdom . |
| 2031198A | 4/1980 | United Kingdom . |
| 2107436 | 4/1983 | United Kingdom . |
| 2277977 | 11/1994 | United Kingdom . |

*Primary Examiner*—Kevin Shaver
*Assistant Examiner*—David A. Bonderer
*Attorney, Agent, or Firm*—Dean W. Russell; Kilpatrick Stockton LLP

[57] ABSTRACT

The valve includes a closure disc (34) sealable at its rim to a valve seat (18) so that in this position the seat (18) and rim define between them an annular space (54) which is connected to a port (60) by passages (54, 56, 58) extending through a mating face (e.g. carbon fibre gasket (22)) of the valve seat (18). As shown the space (54) is a recess in the disc rim defined between fibre seal rings (46, 48) but other arrangements are disclosed in which the seal rings and/or recess may be accommodated in the valve seat. The port (60) may be used for leakage detection, pressure monitoring of bleeding or fluid injection.

5 Claims, 3 Drawing Sheets

BUTTERFLY VALVES

This invention relates to butterfly valves such as those disclosed in our Patent Specification GB 2031198. The closure member in a butterfly valve is a disc rotatable through substantially 90° from the closed to a fully open position. The disc may be adapted to seal against a frustoconical valve seat. To prevent the disc from binding in or scuffing excessively against the seat, the seat axis may be set at an angle to the valve bore axis, with the axis of rotation of the disc offset from the central plane of the disc towards the broader rim of the seat, and off centre from the valve bore axis, towards that side of the bore to which the projected apex of the valve seat points.

More particularly, the invention concerns the provision in such valves of a safety feature known as a double block and bleed facility. In many safety critical systems, adjacent parts are connected together by a series of two seals forming a double barrier. The space between the seals is connected to a port which may be used to monitor leakage past one of the seals, to bleed off or neutralise pressure changes caused by leakage into or from the space, or to inject fluid, for example to temporarily seal the leak or purge the system. Two separate valves may be connected together in series by a conduit which is ported to provide a double block and bleed facility. Some valves, for example gate valves, may include separate seals against upstream and downstream faces of their closure members. These seals define an isolated chamber which may be ported to provide a double block and bleed facility within a single valve. As disclosed for example in GB 2277977, GB 1604095, GB 1512482 and GB 1428066 butterfly valves having twin discs or discs with twin sealing rims are known in which when the valve is closed, the space enclosed between the discs or rims communicates with a port in the valve body thereby providing a double block and bleed facility. In GB 901607, such a space is defined between a pair of rubber sealing rings mounted in a metal ring received in a rebate in a cylindrical valve casing.

The present invention aims to provide improved sealing arrangements for such passages in butterfly valves in which the valve seat is a separate element.

In accordance with the present invention we provide a butterfly valve comprising a closure disc sealable at its rim to a valve seat, the rim and seat when so sealed defining between them an annular space which is connected to a port to provide a double block and bleed facility, wherein the valve seat is a separate element having a mating face lying transversely of the valve bore and sealed to a shoulder in the body of the valve, the port comprising a passage connected at one end to the space and extending through the mating face to the exterior of the valve, characterised in that the space is formed by a groove provided around the periphery of a resilient seal element for co-operation with a substantially flat face of the valve seat or closure disc edge; the seal element comprising two rings between which a recessed rigid ring is sandwiched to form the groove. There will generally be a clearance between the valve body and the valve seat to permit its ready installation. Routing the port through the mating face avoids the necessity of sealing the port with respect to the seat/body clearance. Preferably the passage extends substantially normal to the mating face, for example substantially parallel to the valve bore axis.

The two rings between which the recessed rigid ring is sandwiched may be laminated from metal foil/carbon fibre. The seal element is preferably carried by the closure disc.

Illustrative embodiments of the invention are described below with reference to the drawings in which.

Figure 1:
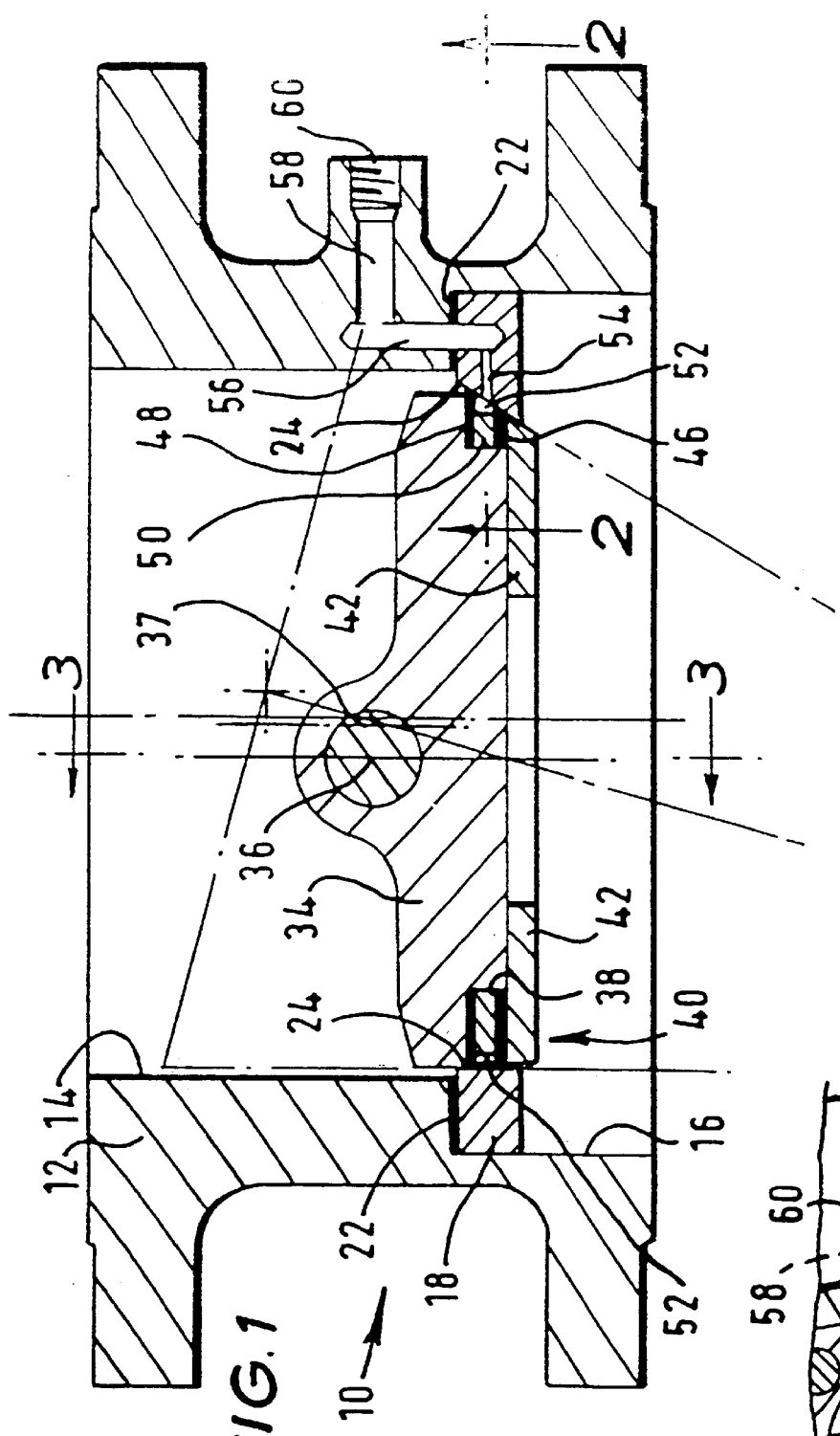
FIG. 1 is a cross-sectional view of a preferred embodiment of the present invention.
Figure 2:
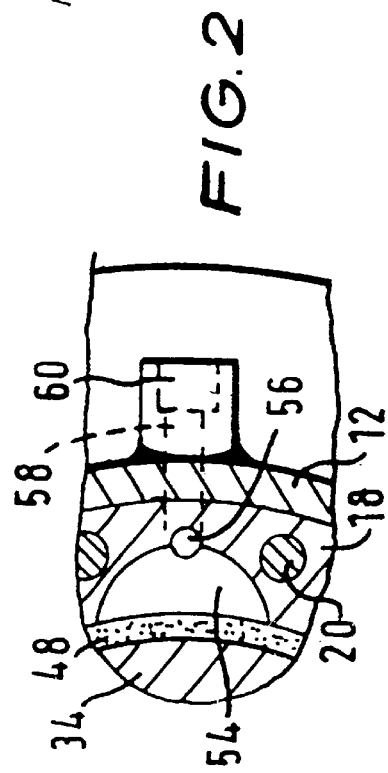
FIG. 2 is a section on line 2—2 of FIG. 1.
Figure 3:
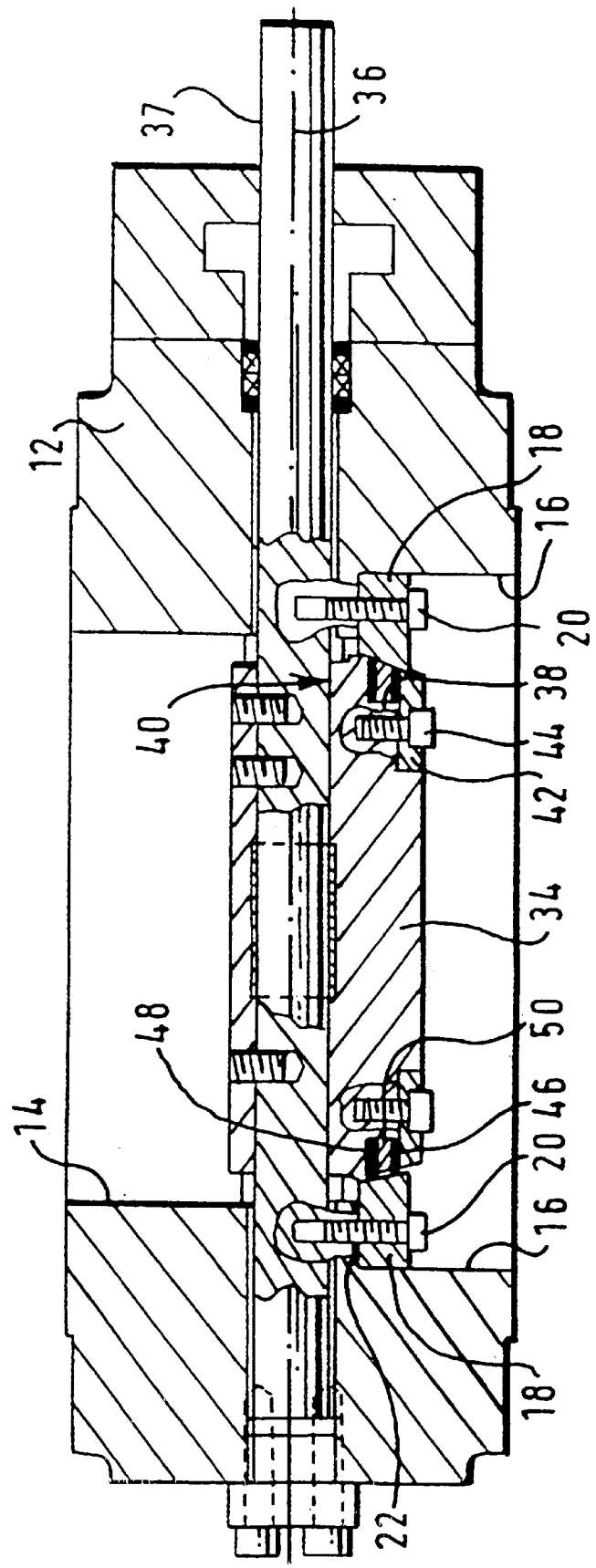
FIG. 3 is a section on line 3—3 of FIG. 1.

Referring to FIGS. 1 to 3, a preferred double block and bleed butterfly valve 10 comprises a body 12 having a through bore 14 counter bored at 16 to receive a replaceable valve seat 18 secured by bolts 20. A gasket 22 of carbon fibre or other fire resistant material is interposed between the mating face of the valve seat 18 and the adjacent surface of the body 12. The valve seat 18 has a frustoconical sealing surface 24 whose axis 26 is set at an angle so that generatrix 30 lies parallel to the valve bore axis 28. The opposite generatrix 32 is also indicated in FIG. 1.

A valve disc or blade 34 seals against the valve seat 18 when closed and is opened by pivoting about the axis 36 of a shaft 37. Disc 34 has a peripheral recess 38 in which a seal element 40 is held by a clamping ring 42 and bolts 44. Seal element 40 comprises a pair of seal rings 46, 48 of fire resistant material such as laminated metal foil and carbon fibre, between which is sandwiched a solid metal spacer ring 50. The outer peripheries of rings 46, 48 are machined to conform to and seal against the adjacent frustoconical face 24 of the valve seat 18 when the disc is in the closed position. The outer periphery of the ring 50 is recessed inwardly of the seal ring 46, 48 outer peripheries, so that together the rings 46, 48, 50 and valve seat 18 define an annular space 52.

As shown in FIGS. 1 and 2, a crescent shaped groove 54 is milled into the sealing surface 24 of the valve seat 18. Groove 54 communicates with the annular space 52 and with a drilling 56 extending axially of the valve through the gasket 22 and into the valve body 12. A radial drilling 58 extends from drilling 56 to an external port 60 threaded for connection to a bleed valve and/or pressure monitoring or fluid injection equipment (not shown). Fluid leaking past seal ring 48 will be trapped by seal ring 46 so as to drain into the annular space 52, from where its pressure can be monitored or its presence otherwise detected via the external port 60. Port 60 can fulfil all the functions that would be served by a conventional double block and bleed facility as described above.

Because the seal rings 46, 48 are closely spaced, they do not interfere with proper opening and closing of the valve disc 34 and are not subject to excessive scuffing. This close spacing has the additional benefit that the volume of the annular space 52 is relatively small, whereby only slight leakage past seal ring 48 will result in easily detectable pressure changes at the port 60.

Figure 4:
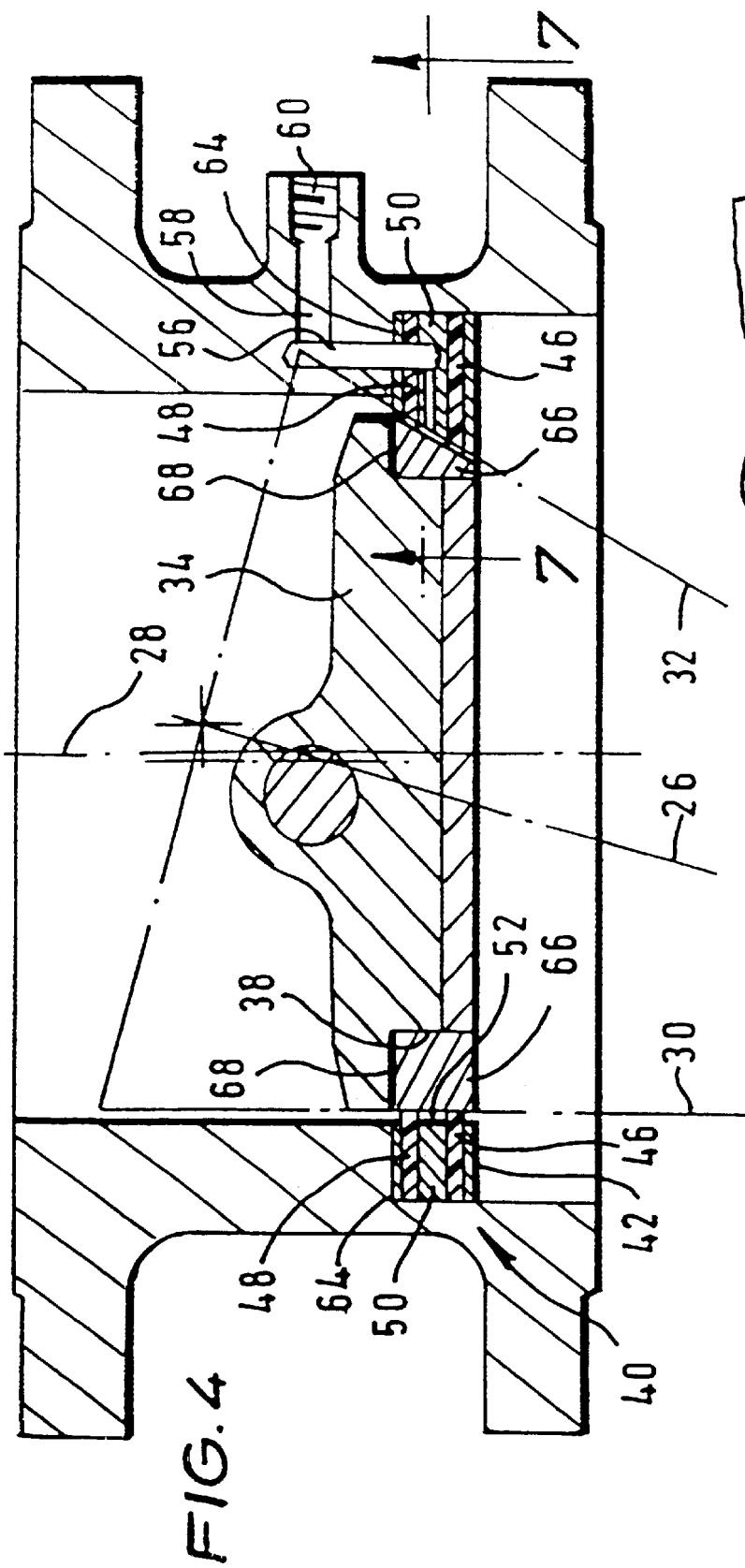
FIGS. 4 and 5 are views corresponding to FIGS. 1 and 2 but showing a second embodiment of the invention.
Figure 5:
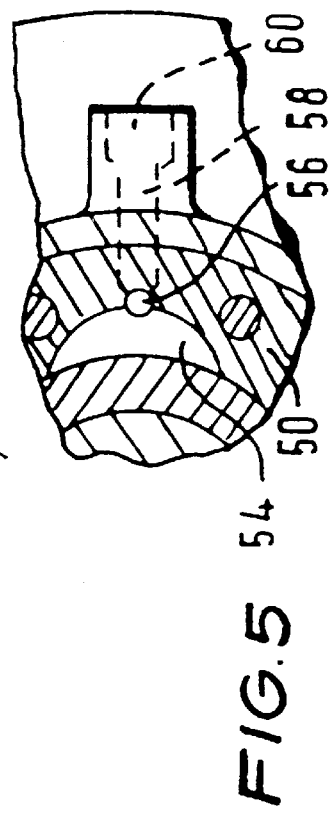

FIGS. 4 and 5 show a second embodiment in which the valve disc 34 carries a solid metal ring 66 and a gasket 68 in place of the seal element 40 and clamping ring 42. The rigid valve seat 18 of FIG. 1 is replaced in FIG. 5 by the seal element 40, clamping ring 42 and a further backup ring 64.

Various further modifications will be apparent. For example the ring 66 of FIG. 4 may be replaced by an integral part of the valve disc 34.

What is claim is:

1. A butterfly valve (10) comprising a closure disc (34) sealable at its rim to a valve seat (18), the rim and seat when so sealed defining between them an annular space (52) which is connected to a port (54, 56, 58, 60) to provide a double block and bleed facility, wherein the valve seat (18) is a separate element having a mating face lying transversely of the valve bore and sealed to a shoulder in the body of the valve, the port comprising a passage (54, 56, 58) connected at one end to the space and extending through the mating face to the exterior of the valve, characterised in that the space (52) is formed by a groove provided around the periphery of a resilient seal element (40) for co-operation with a substantially flat face of the valve seat or closure disc edge; the seal element comprising two rings (46, 48) between which a recessed rigid ring (50) is sandwiched to form the groove (52).

2. A valve as defined in claim 1, characterised in that the passage (56) extends substantially normal to the mating face.

3. A valve as defined in claim 1, characterised in that the passage (56) extends substantially parallel to the valve bore axis.

4. A valve as defined in claim 1, characterised in that the two rings (46, 48) between which the rigid ring (50) is sandwiched are laminated from metal foil/carbon fibre.

5. A valve as defined in claim 1, characterised in that the seal element (40) is carried by the closure disc (34).

\* \* \* \* \*